United States Patent [19]

Saito

[11] Patent Number: 4,702,430

[45] Date of Patent: Oct. 27, 1987

[54] ADJUSTABLE FORCE DRAG BRAKE DEVICE FOR A FISHING REEL

[75] Inventor: Masaji Saito, Tokyo, Japan

[73] Assignee: Daiwa Seiko Co, Ltd., Tokyo, Japan

[21] Appl. No.: 756,609

[22] Filed: Jul. 19, 1985

[30] Foreign Application Priority Data

Jul. 20, 1984 [JP] Japan .............. 59-109839[U]

[51] Int. Cl.⁴ .............................................. A01K 89/02
[52] U.S. Cl. ...................... 242/84.5 A; 242/84.21 R
[58] Field of Search ................ 242/84.5 R, 84.5 A, 242/84.5 P, 84.51 A, 84.51 R, 84.21 R

[56] References Cited

U.S. PATENT DOCUMENTS

| | | | |
|---|---|---|---|
| 2,910,253 | 10/1959 | Nurmse | 242/84.5 P |
| 2,988,298 | 6/1961 | Purnell | 242/84.2 A |
| 3,020,665 | 2/1962 | Hull | 242/84.51 A |
| 3,948,465 | 4/1976 | Scusa | 242/84.5 R |
| 4,466,580 | 8/1984 | Toda | 242/84.5 P |
| 4,470,554 | 9/1984 | Kobayashi et al. | 242/84.5 P |
| 4,509,705 | 4/1985 | Councilman et al. | 242/84.5 P |
| 4,591,108 | 5/1986 | Ban | 242/84.5 R |

Primary Examiner—Billy S. Taylor
Attorney, Agent, or Firm—Cushman, Darby & Cushman

[57] ABSTRACT

A braking device for the spool of a fishing rod is disclosed which contains two separate braking adjustments. The first braking adjustment adjusts the coarse breaking force. The second braking adjustment adjusts a finer braking force. The embodiment discribed uses two springs to bias braking boards to friction boards, the two springs being adjustable separately. The first spring is adjustable by varying the linear displacement of an adjusting cylinder which is threaded into a portion of the fishing spool apparatus. A second adjusting mechanism uses a cam with a varying radius pending on the location of the cam. This varying radius is biased against a leaf spring, thus varying the displacement of the one end of the lead spring depending on the location of the variable cam.

3 Claims, 6 Drawing Figures

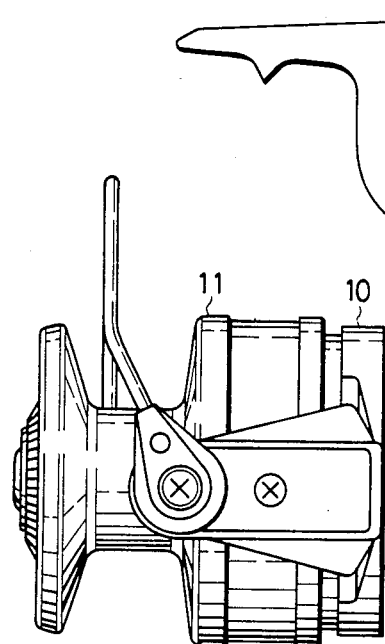
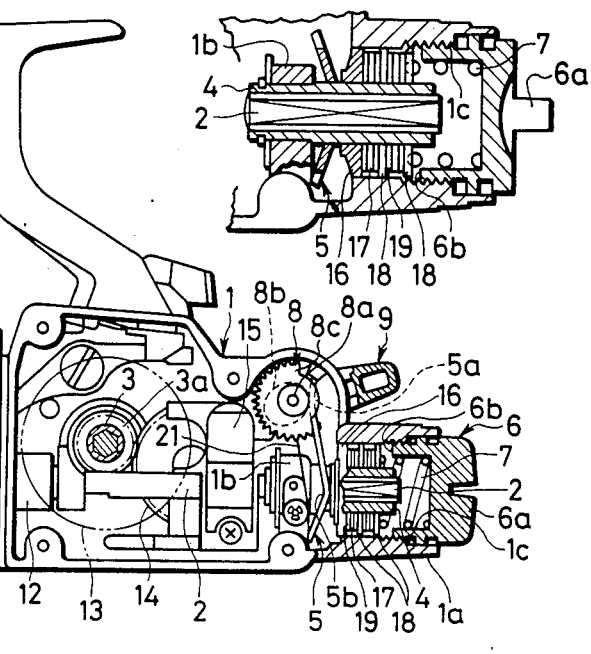
FIG. 1
FIG. 2
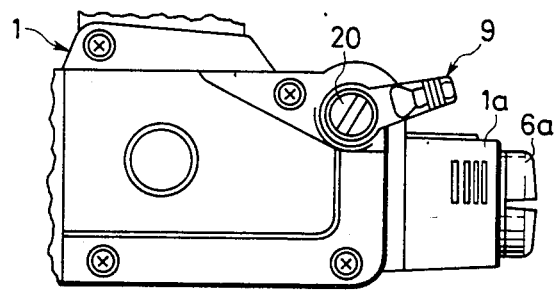
FIG. 3

ADJUSTABLE FORCE DRAG BRAKE DEVICE FOR A FISHING REEL

FIELD OF THE INVENTION

This invention relates to a drag brake device for a fishing spinning reel, in which a brake member which has friction boards and brake boards is compressed with a leaf spring and a coil spring both of which are provided in an adjusting cylinder.

BACKGROUND OF THE INVENTION

In fishing with a fishing reel, the fisherman determines the desireable size of fishing line by taking the kind and size of fish bein fished for into consideration. The drag brake force is generally set by adjusting a spool to a value which is suitable for the pulling force of a catch and the tension withstanding strength of the fishing line.

In a typical conventional drag brake device, a friction board is clamped with brake boards. A coil spring to bias the brake boards to the friction boards is provided in an adjusting cylinder. In a low drag brake condition, the coil spring is used to push the brake boards. For a high drag brake condition, the end face of the adjusting cylinder itself is used to push the brake boards. The resultant drag brake force F with respect to the advancing angle G of the adjusting cylinder is as indicated by the braking characteristics curve C in FIG. 5. In the former case, the drag brake force is maximum with an angle $\alpha$; and in the latter case, it is maximum with an angle $\delta$. Thus, the conventional drag brake device suffers from the disadvantage that the drag brake force is abruptly changed at the point where the two angles are switched.

Furthermore, a drag brake device has been proposed in which a friction board is interposed between brake boards, a leaf spring abutted against the front brake board is pushed with a lever and a cam plate, and the front end face of an adjusting cylinder is used to push the rear brake board in order to adjust the brake force. The device operates according to braking characteristic curves D and E in FIG. 6, each of which forms an angle $\beta$. When the adjusting cylinder is loosened, the device operates according to the curve D, and when the adjusting cylinder is tightened, the device is operated according to the curve E. Thus, with this device it is impossible to obtain a moderately sloped braking characteristic curve providing a weak drag brake force.

Thus, as can be seen, the conventional drag brake device is disadvantageous in that the drag force adjustment is rather difficult.

The drag brake device of the present invention is constructed to overcome the problems as described above. Therefore, although the device is simple in construction, a smooth braking characteristic curve can be obtained, and a wide range of drag brake forces can be readily obtained by operating a drag adjusting knob and a drag adjusting lever. Furthermore, a most suitable range of drag brake forces can be determined according to the kind and size of fish desired to catch and the size of a fishing line used. Accordingly, the application of an improper drag brake force to the reverse rotation of the spool shaft is prevented, and the occurrences of fishing line being overstressed during fishing will be minimized. Thus, the drag brake device provided according to the invention for a fishing spinning reel should be highly appreciated in practical use.

SUMMARY OF THE INVENTION

In view of the above-described difficulties accompanying a conventional drag brake device, an object of the invention is to provide a drag brake device for a fishing spinning reel which has a leaf spring and a coil spring in an adjusting cylinder, both of which can adjust the drag brake force. These are abutted against both sides of a brake member, so that a smooth braking characteristic curve can be obtained. This braking curve consists of a gently inclined part providing a relatively weak drag brake force, a steeply inclined part providing a strong drag brake force, and a relatively gently inclined part (connected between the above-described two parts) to provide a moderate drag brake force.

The present invention has a cylinder provided at the rear end of a reel casing, a segmental cylindrical shaft fixedly mounted on a spool shaft and a brake member fitted on the segmental cylindrical shaft. The cylindrical shaft rotates in synchronism with the rotation of the spool. A leaf spring, which can adjust the brake force, is abutted against a side of the brake member. An adjusting cylinder is threadably engaged with the above-described cylinder in such a manner that the adjusting cylinder can be moved back and forth. A coil spring provided in the adjusting cylinder is abutted against the other side of the brake member thus further adjusting the braking force.

BRIEF DESCRIPTION OF THE DRAWINGS

An exemplary and presently preferred embodiment of the invention will be described in detail with reference to the accompanying drawings, wherein:

FIG. 1 is a side view, partly as a sectional view, showing a fishing spinning reel;

FIG. 2 is an enlarged sectional side view showing a cylinder provided on the rear side of a reel casing;

FIG. 3 is an external side view showing essential parts of the reel casing;

DESCRIPTION OF THE PREFERRED EMBODIMENT

Figure 4:
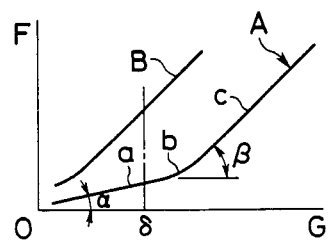
FIG. 4 is a graphical representation indicating braking characteristic curves provided by a drag brake device according to this invention and FIGS. 5 and 6 are graphical representations indicating braking characteristic curves provided by a conventional drag brake devices.
Figure 5:
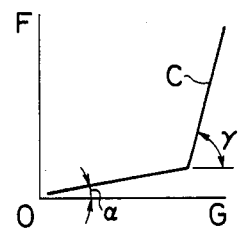
Figure 6:
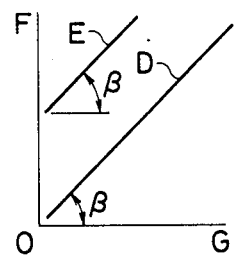

A drag brake device for a fishing spinning reel according to the invention is shown in FIGURES 1 and 2. This device consists of a rotor 10 and a spool 11. These are secured respectively to a rotary shaft cylinder (not shown) and a spool shaft 2 both of which are protruded on the front side of a reel casing 1.

A gearing device for transmitting motion of spool 10 to spool shaft 2 is constructed as follows. A pinion 12 is formed inside reel casing 1 on the outer wall of the rotary shaft cylinder. A handle hollow shaft 3 is supported through bearings on reel casing 1 and a drive gear 13 is fixedly mounted on handle hollow shaft 3 and engaged with pinion 12. An oscillation gear 14 is engaged with an oscillation pinion 3a of handle hollow shaft 3, and moves spool shaft 2 back and forth, thus transmitting the rotary motion of rotor 10 and spool 11 to spool shaft 2. A moving piece 15 is mounted on spool shaft 2 in such a manner that it is rotatable around but not in the axial direction of shaft 2.

A cylinder is protruded on the rear side of reel casing 1, and a segmental cylindrical shaft 4 is fixedly secured to spool shaft 2. A bearing part 1b is in reel casing 1 and is pivotally mounted on one end of the cylindrical shaft 4 in such a manner that it may not come off cylindrical shaft 4. A leaf spring 5 and a brake board 16, a plurality of drag brake boards 17 and 18 and a plurality of friction boards 19 are also fitted on shaft 4.

An adjusting cylinder 6 is engaged with the female-threads 1c which are formed in the end region of the inner wall of the cylinder 1a. A coil spring 7 is interposed between the outermost drag brake board 18 and the adjusting cylinder 6. A drag adjusting knob 6a is formed on the adjusting cylinder 6 to adjust the bias of coil spring 7. This is formed in such a way as to facilitate turning with the fingers. An engaging groove is also formed in adjusting knob 6a so that it can be turned by a coin or a screwdriver. A cam plate 8 pushes one end 5a of leaf spring 5, and drag adjusting lever 9 is provided which, as shown in FIG. 3, is secured to both ends of a shaft 8a with screws 20. Shaft 8a is integral with the cam plate 8 and is inserted into shaft holes in the rear part of the reel casing 1. Leaf spring 5 is substantially L-shaped in section, and its top 5b is abutted against brake board 16.

Referring to FIG. 1, the envelope of cam surface 8b of cam plate 8 has a radius which is gradually increased as the cam is rotated. A gear 8c has a rotation which is click-stopped. One end 5a of the leaf spring 5 is abutted against the irregular radius cam surface 8b. One end of a click stop spring 21 is engaged with the click-stopped gear 8c.

When the drag adjusting lever 9 is turned fully clockwise in FIG. 1, the minimum drag brake force is obtained; and when it is turned fully counterclockwise, the maximum drag brake force is obtained.

Drag brake boards 17 are fixedly mounted on cylindrical shaft 4. Protrusions extending from the peripheries of brake board 16 and drag brake boards 17 are then fitted in a groove which is formed in the inner wall of the cylinder 1a in such a manner that it is extended along the axial direction of cylinder 1a.

The operation of the drag brake device thus constructed will be described herein.

It will be assumed that the drag adjusting lever 9 is turned to a right-handed side (as shown in FIG. 1) and uses a right-hand screw for the purposes of the foregoing discussion. This could also be accomplish using left-hand screws. In the present case, if the adjusting cylinder 6 is loosened sufficiently, no drag brake force at all is applied to the rotation of the spool shaft 2. This condition corresponds to the left most part of the braking characteristic curve A in FIG. 4.

When the adjusting knob has been turned enough that end face 6b of the adjusting cylinder 6 abuts against the outermost brake board 18, the adjusting cylinder 6 is forced to stop. This position corresponds to the line δ in FIG. 4. Thus, the drag brake force can be adjusted in a range of from 0 to δ with the drag adjusting knob 6a.

Drag adjusting lever 9 serves as an additional force adjusting mechanism. As drag adjusting lever 9 is turned counterclockwise, irregular radius cam 8b gradually increases its radius, and thus exerts a larger force on leaf spring 5. Therefore, brake board 16 is pushed harder by the leaf spring 5. This condition corresponds to a relatively gently sloped part b of the braking characteristic curve A in FIG. 4. As drag adjusting lever 9 is further turned, a stronger drag brake force is applied to the spool shaft 2. This condition corresponds to the steeply inclined part c of an angle $\beta$ of the braking characteristic curve A in FIG. 4.

It has been assumed that the drag adjusting knob 6a would be turned after the drag adjusting lever 9 is turned clockwise to a desired position. Thus, the coarse adjustment of the drag force would be effected first. However, the drag adjusting knob 6a may also be turned with the drag adjusting lever 9 held upright (turned maximum counterclockwise).

In this case, as indicated by the braking characteristic curve B in FIG. 4, the composite brake force of the springs 5 and 7 act from the beginning.

The drag brake device thus constructed can provide the smooth braking characteristic curve A which consists of the gently inclined part b providing the average drag brake force, and the steeply inclined part c providing the relatively strong drag brake force. Therefore, with drag adjusting knob 6a or the drag adjusting lever 9. positioned according to the size of either a fishing line, a desired fish, or a specific fishing method, by operation of drag adjusting knob 6a or the drag adjusting level 9 a wide range of drag brake forces can be readily obtained. Accordingly, during fishing, the occurances of the fishing line being broken or cut will be minimized, and the drag adjusting operation can be readily achieved.

In the above-described embodiment, only one coil spring is used. However, the single coil spring may be replaced by the combination of a relatively long coil spring, small in torque and a relatively short coil spring, large in torque. These springs can be of different diameters, or a combination of coil springs which are equal in diameter, but of different torques which are arranged on both sides of a disk can be used.

Although only a few exemplary embodiments of this invention have been described in detail above, those skilled in the art will readily appreciate that many modifications are possible in the exemplary embodiments without materially departing from the novel teachings and advantages of this invention.

Accordingly all such modifications are intended to be included within the scope of this invention as defined in the following claims.

I claim:

1. A drag brake device for a fishing spinning reel which has a spool which can hold fishing line comprising:
    a cylinder, provided at the rear end of a reel casing, said cylinder having a groove formed in the inner wall thereof in such a manner that said groove is extended along an axial direction of said cylinder;
    a spool shaft, having one end portion adapted to be coupled to a spool and the other end portion extended into said cylinder from the side of said reel casing, the other end portion being a segmental shaft;
    a segmental cylindrical shaft supported on said casing and having a hold engaged with said segmental shaft, so that said segmental shaft is slidable in the axial direction and rotatable together with said cylindrical shaft;
    a first brake member mounted on said segmental cylindrical shaft in said cylinder in such a manner that said first brake member has a peripheral portion engaged with said groove formed in said inner wall of said cylinder and allows said segmental cylindrical shaft to rotate;

a second brake member mounted on said segmental cylindrical shaft in such a manner that said second brake member is rotatable with respect to said groove formed in said inner wall of said cylinder but not rotatable with respect to said segmental cylindrical shaft;

a friction board interposed between said first and second brake members;

a brake board having a protrusion extended from a peripheral portion thereof which is confronted with said casing in which said brake. members are stacked, said protrusion being engaged with said groove formed in said inner wall of said cylinder so that said brake board is movable in the axial direction with respect to said segmental cylindrical shaft;

an adjusting cylinder, threadably engaged with said cylinder, in such a manner that the movement thereof in the axial direction is adjustable;

a rear pressing spring member interposed between the rear surface of said first brake member and said adjusting cylinder;

a front pressing spring member having a middle portion abutted against the front surface of said second brake member, and having one end supported on said casing and the other end abutted against a cam member which is rotatably supported by said casing in such a manner that the position of said front pressing spring member is adjustable; and a drag adjusting lever provided on the outside of said casing and coupled to said cam member.

2. A drag brake device as claimed in claim 1, further comprising:

a plate-shaped drag adjusting knob is means, formed on the exposed portion of said adjusting cylinder, for facilitating the turning of said adjusting cylinder;

engaging groove, in the middle of the rear surface of said drag adjusting knob, menas for engaging with a tool and further facilitating rotation of said adjusting cylinder;

said cam member being pivotally supported in the upper rear portion of said casing in such a manner that said cam member is rotatably in a direction perpendicular to said spool shaft, and said drag adjusting lever being fixedly mounted on the supporting shaft of said cam member in such a manner that said drag adjusting member is extended over the upper surface of said casing and along said supporting shaft.

3. A device as in claim 1 wherein said cam member has an irregular radius.

* * * * *